United States Patent
Ren et al.

(10) Patent No.: US 10,189,387 B2
(45) Date of Patent: Jan. 29, 2019

(54) FASTENING TAPE WITH FLEXIBILITY IN THE LATERAL DIRECTION AND ASSOCIATED METHODS

(71) Applicant: YKK CORPORATION, Tokyo (JP)

(72) Inventors: Zhiyu Ren, Macon, GA (US); Tsuyoshi Minato, Macon, GA (US); Atsushi Nakaya, Macon, GA (US); Kenta Okada, Tokyo (JP)

(73) Assignee: YKK Corporation (JP)

( * ) Notice: Subject to any disclaimer, the term of this patent is extended or adjusted under 35 U.S.C. 154(b) by 108 days.

(21) Appl. No.: 15/154,676

(22) Filed: May 13, 2016

(65) Prior Publication Data

US 2017/0013919 A1    Jan. 19, 2017

Related U.S. Application Data

(60) Provisional application No. 62/193,989, filed on Jul. 17, 2015.

(51) Int. Cl.
*B60N 2/72* (2006.01)
*B60N 2/58* (2006.01)
*A44B 18/00* (2006.01)

(52) U.S. Cl.
CPC ............ *B60N 2/72* (2013.01); *B60N 2/5833* (2013.01); *A44B 18/0076* (2013.01)

(58) Field of Classification Search
CPC .... B60N 2/72; B60N 2/5873; A44B 18/0076; Y10T 24/27; Y10T 24/428; Y10T 24/24017

See application file for complete search history.

(56) References Cited

U.S. PATENT DOCUMENTS 6,106,922 A    8/2000    Cejka et al.
6,656,563 B1    12/2003    Leach et al.
(Continued)

FOREIGN PATENT DOCUMENTS

CN    101053458 A    10/2007
CN    102202539 A    9/2011
(Continued)

OTHER PUBLICATIONS

Office Action, Korean Patent Application No. 2016-0089764, dated Nov. 21, 2017.
(Continued)

*Primary Examiner* — Victor D Batson
*Assistant Examiner* — Matthew J Sullivan
(74) *Attorney, Agent, or Firm* — Kilpatrick Townsend & Stockton LLP

(57) ABSTRACT

A fastening tape has flexibility in a lateral (width) direction of the fastening tape. The fastening tape includes a body, a plurality of fasteners, and a plurality of transverse walls. The plurality of fasteners and the plurality of transverse walls extend in an upward direction from a top surface of the body. The plurality of fasteners are arranged in rows extending in the lateral direction. Each transverse wall includes a transverse wall width, and at least some of the plurality of transverse walls are arranged in the rows of the plurality of fasteners and connect fasteners in the rows fasteners. The fastening tape includes at least one slit within or adjacent at least one of the transverse walls, which increases flexibility in the lateral direction of the fastening tape.

27 Claims, 13 Drawing Sheets

(56) References Cited

U.S. PATENT DOCUMENTS

| | | | |
|---|---|---|---|
| 6,720,059 B2 | 4/2004 | Fujisawa et al. | |
| 6,896,759 B2 * | 5/2005 | Fujisawa | A44B 18/0049 |
| | | | 156/244.18 |
| 7,022,394 B2 | 4/2006 | Fujisawa et al. | |
| 7,971,325 B2 | 7/2011 | Line et al. | |
| 8,756,770 B2 * | 6/2014 | Cina | A44B 18/0049 |
| | | | 24/452 |
| 9,034,452 B2 | 5/2015 | Cina et al. | |
| 9,138,032 B1 | 9/2015 | Cina et al. | |
| 9,271,547 B2 * | 3/2016 | Terada | A44B 18/0049 |
| 9,357,815 B2 * | 6/2016 | Minato | A44B 18/0049 |
| 9,635,910 B2 * | 5/2017 | Cina | A44B 18/0003 |
| 2002/0164449 A1 | 11/2002 | Fujisawa et al. | |
| 2002/0164451 A1 | 11/2002 | Fujisawa et al. | |
| 2003/0214068 A1 | 11/2003 | Fujisawa et al. | |
| 2007/0240289 A1 | 10/2007 | Murasaki et al. | |
| 2009/0300890 A1 | 12/2009 | Coronel et al. | |
| 2010/0181695 A1 | 7/2010 | Murasaki et al. | |
| 2011/0062615 A1 | 3/2011 | Murasaki et al. | |
| 2011/0197404 A1 | 8/2011 | Terada et al. | |
| 2013/0167332 A1 | 7/2013 | Terada et al. | |
| 2013/0340214 A1 | 12/2013 | Terada et al. | |
| 2014/0130311 A1 | 5/2014 | Okuda et al. | |
| 2014/0298626 A1 | 10/2014 | Murasaki et al. | |
| 2014/0298628 A1 | 10/2014 | Minato et al. | |
| 2016/0023386 A1 | 1/2016 | Terada et al. | |
| 2016/0242512 A1 | 8/2016 | Minato et al. | |
| 2017/0013918 A1 | 1/2017 | Ren et al. | |
| 2017/0295890 A1 * | 10/2017 | Imai | A44B 18/0076 |
| 2018/0271229 A1 | 9/2018 | Terada et al. | |

FOREIGN PATENT DOCUMENTS

| | | |
|---|---|---|
| CN | 103079422 A | 5/2013 |
| CN | 103350531 A | 10/2013 |
| CN | 103415226 A | 11/2013 |
| CN | 104053376 A | 9/2014 |
| JP | 06064825 | 9/1994 |
| JP | H06-064825 U | 9/1994 |
| JP | 2001260150 | 9/2001 |
| JP | 3886971 | 2/2007 |
| JP | 4439118 | 3/2010 |
| JP | 2013252453 | 12/2013 |
| JP | 5496339 | 5/2014 |
| KR | 2004-0048927 A | 6/2004 |
| WO | 2010052779 | 5/2010 |
| WO | 2012120618 | 9/2012 |

OTHER PUBLICATIONS

U.S. Appl. No. 15/154,651, Non-Final Office Action, dated Aug. 11, 2017, 16 pages.

U.S. Appl. No. 15/154,651, Restriction Requirement, dated May 1, 2017, 7 pages.

U.S. Appl. No. 15/154,651, Final Office Action, dated Jul. 12, 2018, 15 pages.

U.S. Appl. No. 15/154,651, Final Office Action, dated Mar. 16, 2018, 15 pages.

Office Action, Chinese Patent Application No. 201610556999.7, dated Oct. 19, 2018.

U.S. Appl. No. 15/154,651, Final Office Action, dated Oct. 31, 2018, 18 pages.

* cited by examiner

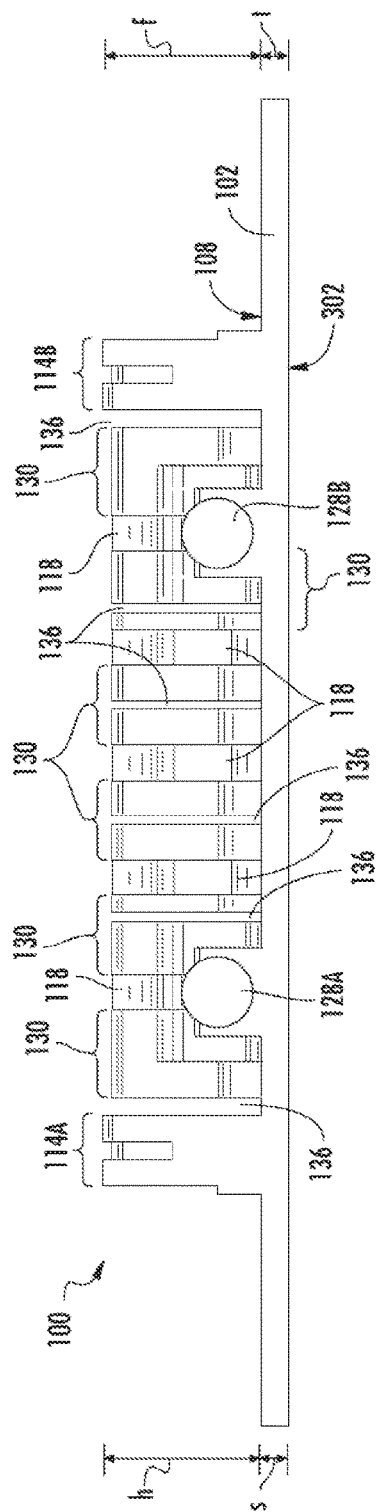
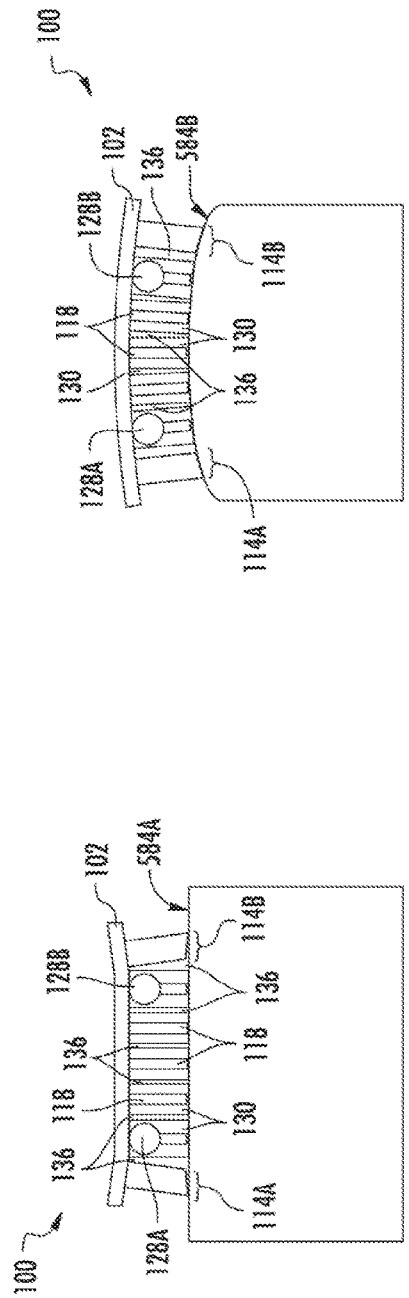

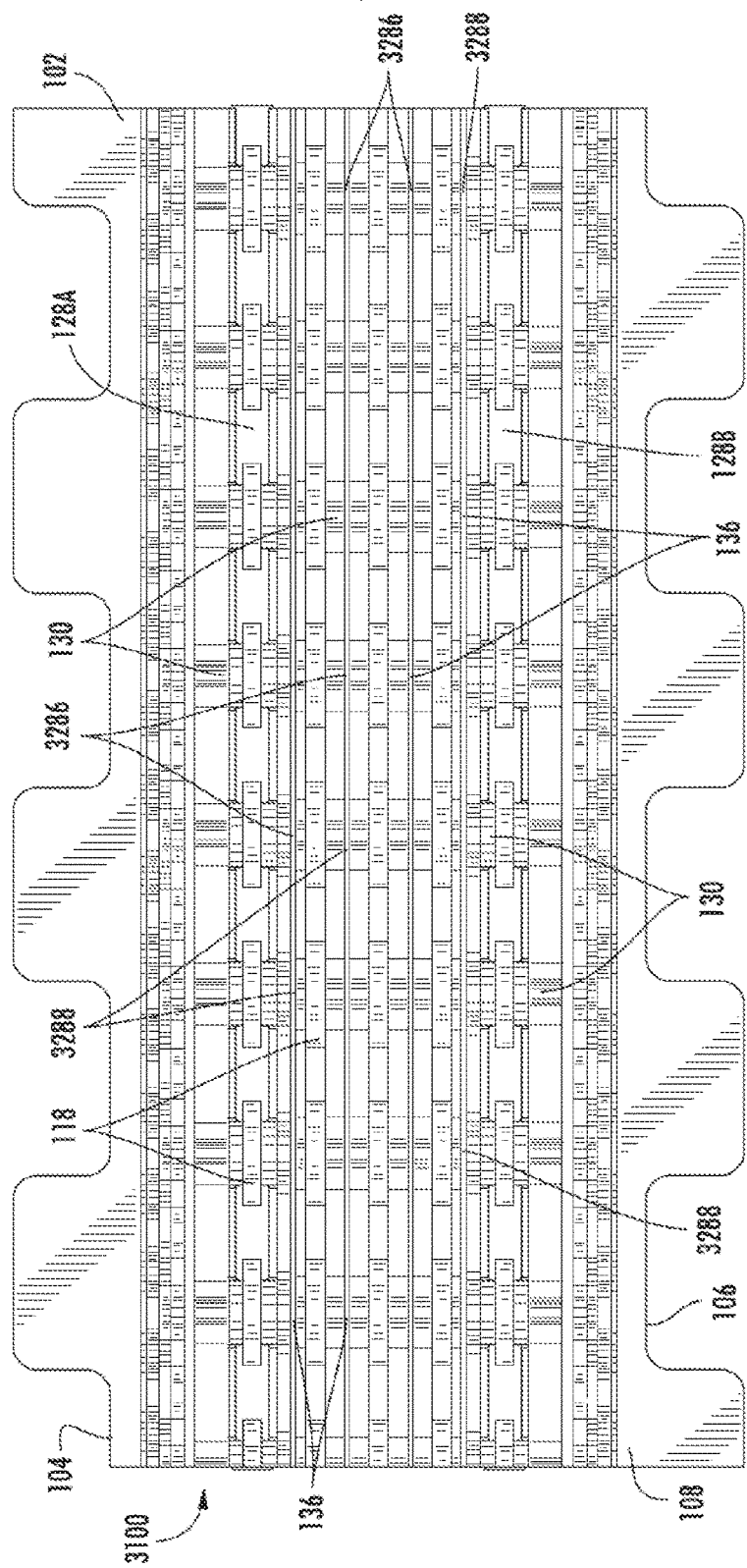

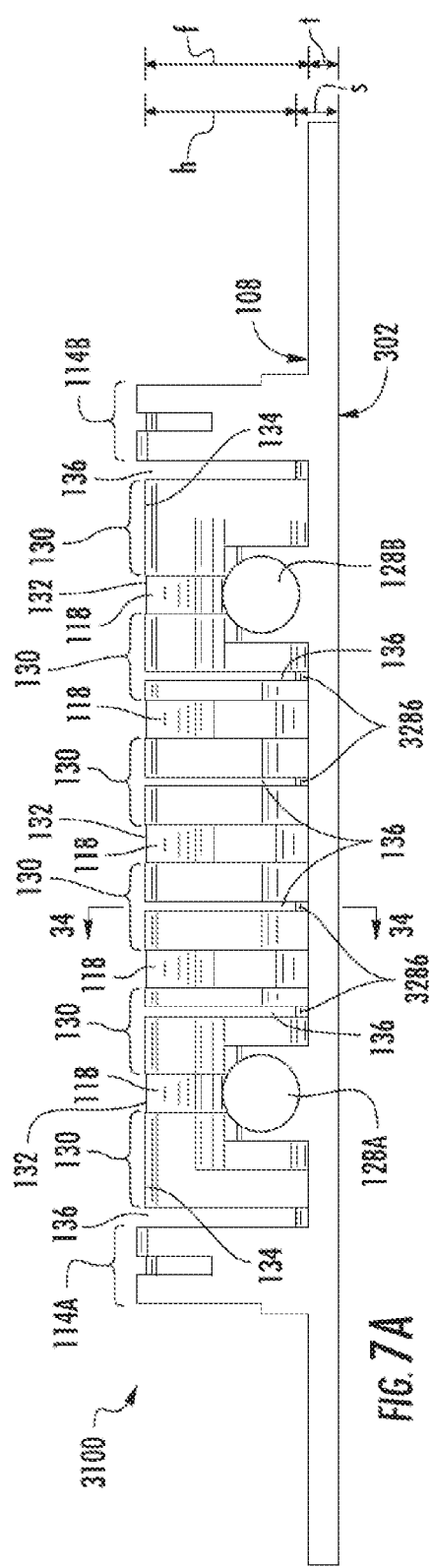
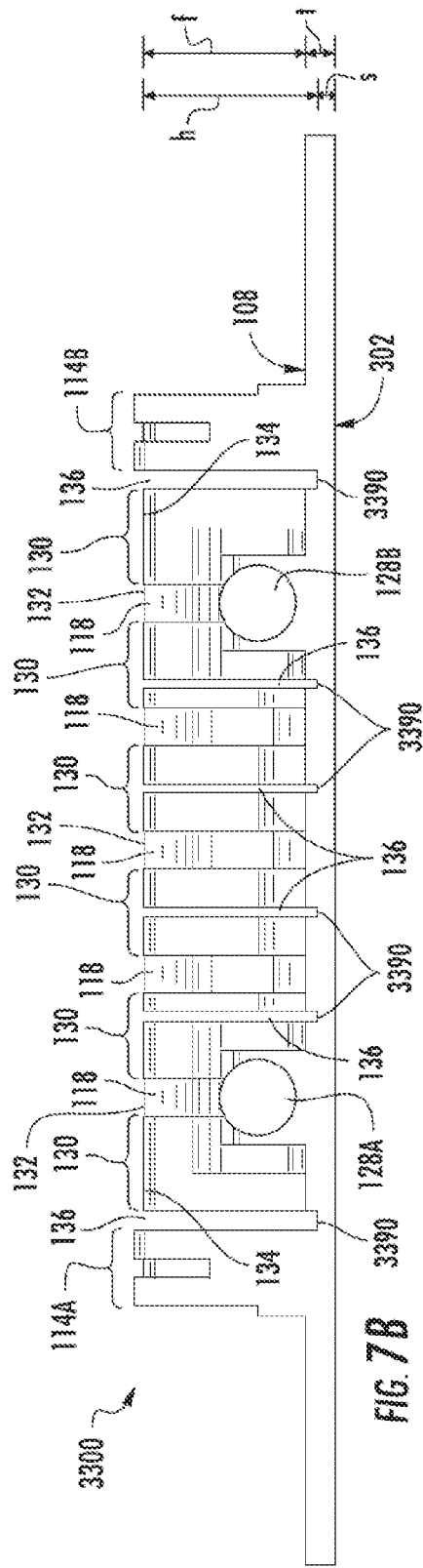

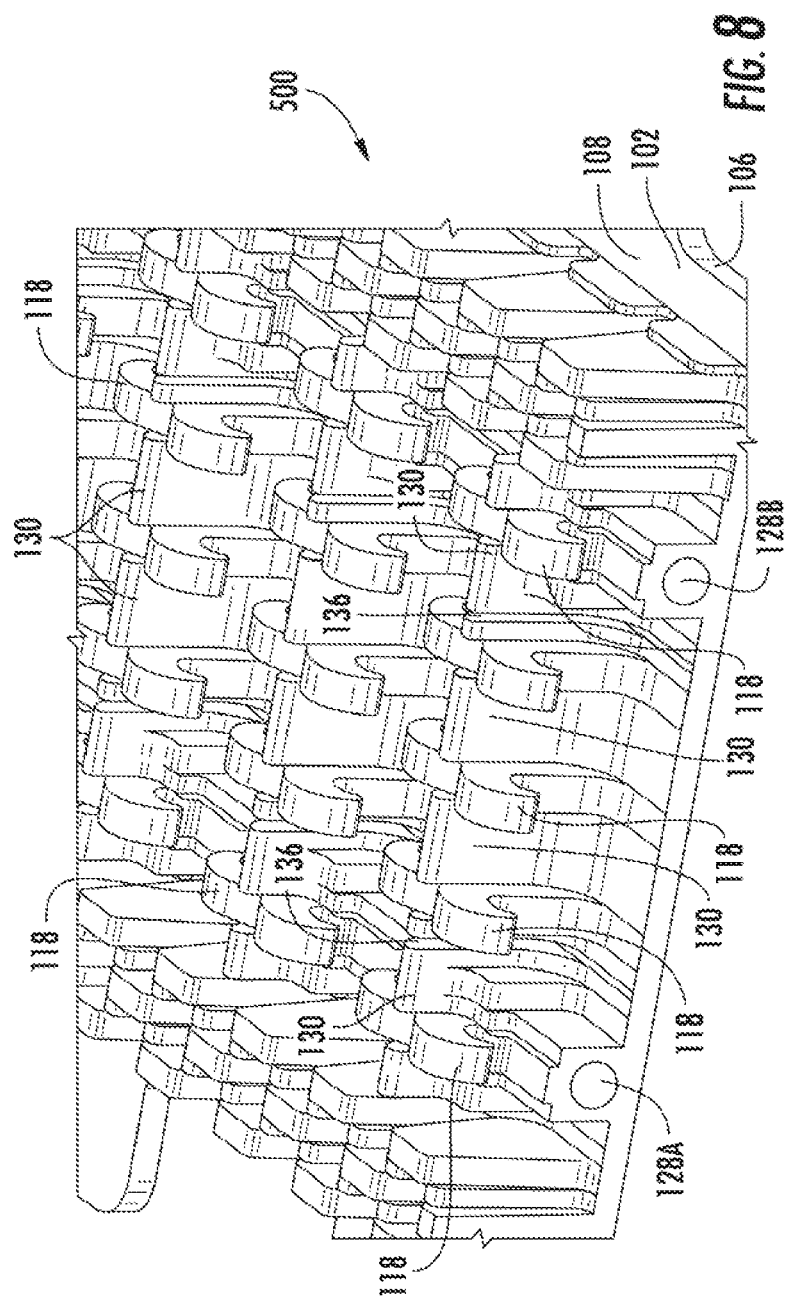

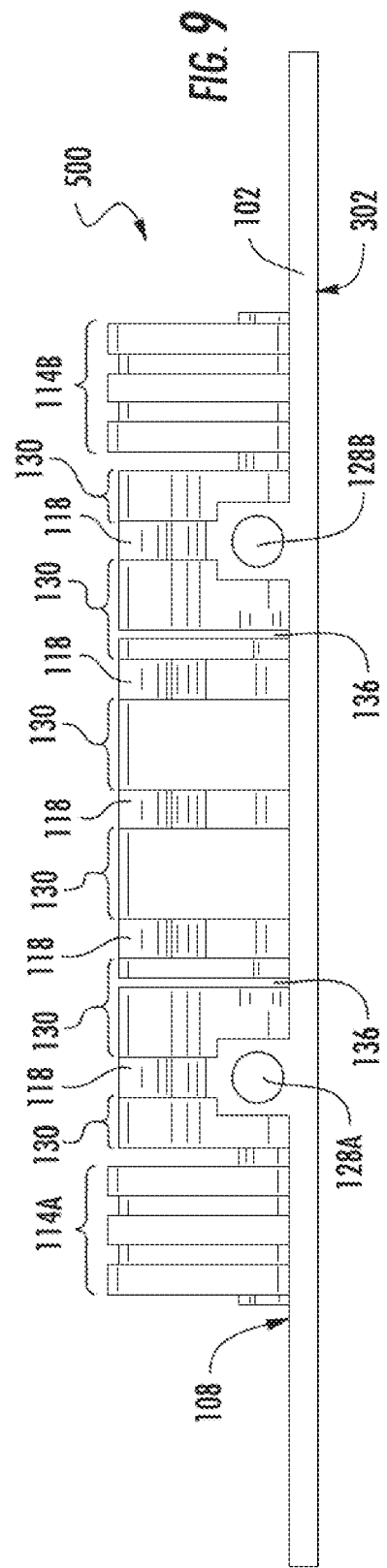

FASTENING TAPE WITH FLEXIBILITY IN THE LATERAL DIRECTION AND ASSOCIATED METHODS

REFERENCE TO RELATED APPLICATION

This application claims the benefit of U.S. Provisional Application No. 62/193,989, filed Jul. 17, 2015 and entitled "Hook Fastening Tape with Flexibility in the Width Direction," which is hereby incorporated by reference in its entirety.

BACKGROUND

Technical Field

The application relates to fastening tape and methods of forming fastening tape.

Background Technology

Fastening tape used in automotive and other applications may be installed on a seat cushion or other component by first placing the fastening tape on a trench within a mold. After the fastening tape has been situated, urethane foam is introduced, which forms the seat cushion or other component around the fastening tape. If foam intrudes into the fastening tape, the fasteners, such as hooks, of the fastening tape are more prone to failure. If the trench surface on which the fastening tape is positioned is curved instead of planar, foam intrusion is more likely.

SUMMARY

The term embodiment and like terms are intended to refer broadly to all of the subject matter of this disclosure. Statements containing these terms should be understood not to limit the subject matter described herein. This summary is a high-level overview of various aspects of the disclosure and introduces some of the concepts that are further described in the Detailed Description section below. This summary is not intended to identify key or essential features, nor is it intended to be used in isolation.

Disclosed are fastening tapes with increased flexibility in the lateral (width) direction to make the tapes easier to bend and/or twist. Also disclosed are methods of making of such tapes. Fastening tape with improved flexibility may better conform to the shape of the surface on which it is placed, including trenches with rounded or curved surfaces, to help reduce the intrusion of foam.

In one aspect, a fastening tape includes a body having a first edge, a second edge distal from the first edge, a bottom surface extending between the first edge and the second edge, and a top surface extending between the first edge and the second edge. The body defines a lateral direction from the first edge to the second edge and a longitudinal direction transverse to the lateral direction.

The fastening tape also includes a plurality of fasteners extending in an upward direction from the top surface of the body and arranged in rows extending in the lateral direction of the body. Each fastener of the plurality of fasteners has a height f. The fastening tape also includes a plurality of transverse walls extending in the upward direction from the top surface of the body. Each transverse wall of the plurality of transverse walls extends in the lateral direction of the body and comprises a transverse wall width. At least some of the plurality of transverse walls are arranged in the rows of the plurality of fasteners and connect fasteners of the rows of the plurality of fasteners. Moreover, the fastening tape includes at least one slit within a transverse wall or adjacent at least one of the transverse walls. The at least one slit extends from a topmost end of the transverse wall towards the top surface of the body and has a slit width that is less the transverse wall width. In certain cases, the at least one slit has a height h that is greater than or equal to approximately f−0.15 f (or about 0.85 f) and that is less than or equal to approximately f+0.15 f (or about 1.15 f).

In some examples, the fastening tape also includes a first sidewall extending in the upward direction from the top surface between the first edge and the second edge. The fastening tape also may include a second sidewall extending in the upward direction from the top surface between the first sidewall and the second edge. In these aspects, the plurality of fasteners are arranged between the first sidewall and the second sidewall, and the transverse walls extend in the lateral direction of the body between the first sidewall and the second sidewall. In some examples, a height of each of the plurality of transverse walls is generally the same as a height of each of the plurality of fasteners.

In some cases, the at least one slit is defined by one of the plurality of transverse walls and the first sidewall.

In other cases, the at least one slit is defined by one of the plurality of transverse walls and one of the plurality of fasteners.

And in yet other cases, the at least one slit is defined by at least one of the transverse walls that is arranged in the rows of the plurality of fasteners and that extends between fasteners.

In some examples, the fastening tape includes a first slit that is within or adjacent at least one of the transverse walls of the plurality of transverse walls in a first of the rows of the plurality of fasteners and a second slit that is within or adjacent at least one of the transverse walls of the plurality of transverse walls in a second of the rows of the plurality of fasteners. The first slit extends from the topmost end of the transverse wall towards the top surface of the body and has a first slit width that is less the transverse wall width and the second slit extends from the topmost end of the transverse wall towards the top surface of the body and has a second slit width that is less the transverse wall width.

Various implementations described in the present disclosure can include additional systems, methods, features, and advantages, which are not necessarily expressly disclosed herein, but will be apparent to one of ordinary skill in the art upon examination of the following detailed description and accompanying drawings. All such systems, methods, features, and advantages are included within the present disclosure and protected by the accompanying claims.

BRIEF DESCRIPTION OF THE DRAWINGS

Illustrative embodiments of the present disclosure are described in detail below with reference to the following drawing figures:

FIG. 3 is an end view of the segment of fastening tape of FIG. 1.

FIG. 4A is an end view of the segment of fastening tape of FIG. 1 on a flat trench surface.

FIG. 4B is an end view of the segment of fastening tape of FIG. 1 on a curved trench surface.

FIG. 6 is a top view of the segment of fastening tape of FIG. 5.

FIG. 7A is an end view of the segment of fastening tape of FIG. 5.

FIG. 7B is an end view of a segment of fastening tape according to an aspect of the current disclosure.

FIG. 8 is a partial top perspective view of a segment of fastening tape according to an aspect of the current disclosure.

FIG. 9 is an end view of the segment of fastening tape of FIG. 5.

DETAILED DESCRIPTION

Figure 1:
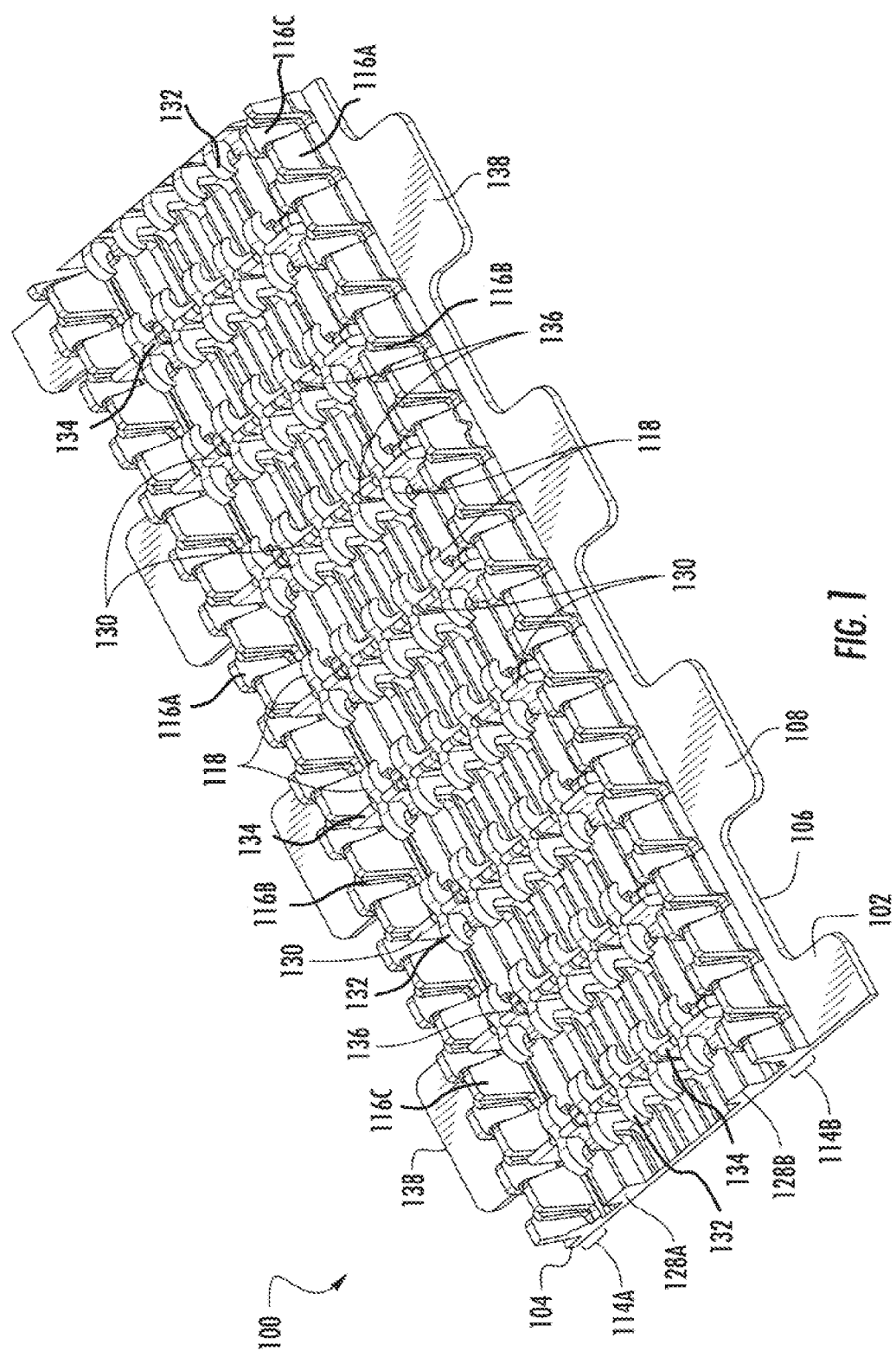
FIG. 1 is a top perspective view of a segment of fastening tape according to an aspect of the current disclosure.

The subject matter of aspects and examples of the present invention is described here with specificity to meet statutory requirements, but this description is not necessarily intended to be limiting. The described subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The following description is provided as an enabling teaching of the invention. To this end, those of ordinary skill in the relevant art will recognize and appreciate that many changes can be made to the various aspects of the invention described herein, while still obtaining the beneficial results of the invention. It will also be apparent that some of the desired benefits can be obtained by selecting some of the features of the invention without utilizing other features. Accordingly, those who work in the art will recognize that many modifications and adaptations to the invention are possible and can even be desirable in certain circumstances and are a part of the invention. Thus, the following description is provided as illustrative of the principles of the invention and not in limitation thereof.

As used throughout, the singular forms "a," "an" and "the" include plural referents unless the context clearly dictates otherwise. Thus, for example, reference to "a fastener" can include two or more such fasteners unless the context indicates otherwise.

Ranges can be expressed herein as from "about" one particular value and/or to "about" another particular value. When such a range is expressed, another aspect includes from the one particular value and/or to the other particular value. Similarly, when values are expressed as approximations, by use of the antecedent "about," the particular value forms another aspect. Moreover, the endpoints of each of the ranges are significant both in relation to the other endpoint, and independently of the other endpoint.

As used herein, the terms "optional" or "optionally" mean that the subsequently described event or circumstance can or can not occur, and that the description includes instances where said event or circumstance occurs and instances where it does not.

The word "or" as used herein means any one member of a particular list and also includes any combination of members of that list. Further, conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects. Directional references such as "up," "down," "top," "left," "right," "front," "back," and "corners," among others, are intended to refer to the orientation as illustrated and described in the figure (or figures) to which the components and directions are referencing.

Disclosed are fastening tapes and associate methods, systems, devices, and various apparatuses. In one aspect, a fastening tape has a body, sidewalls, a plurality of fasteners such as hooks, and transverse walls. One of ordinary skill in the art will understand that the disclosed fastening tapes are described in but a few exemplary aspects among many.

Figure 2:
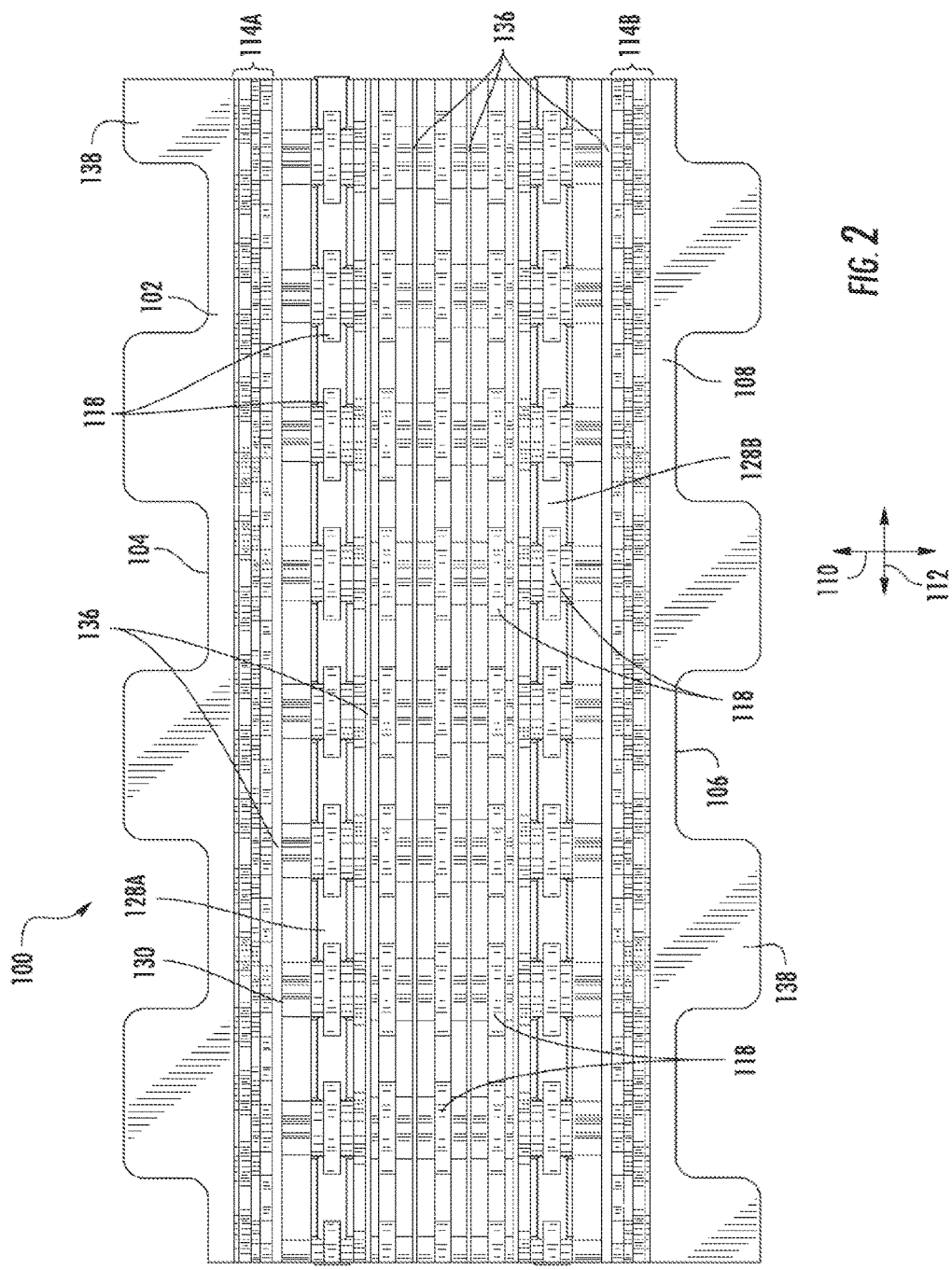
FIG. 2 is a top view of the segment of fastening tape of FIG. 1.

Referring to FIGS. 1-3, a fastening tape 100 includes a body 102 having a first edge 104 and a second edge 106 distal from the first edge 104. The body 102 further includes a top surface 108 and a bottom surface 302 (FIG. 3), each extending between the first edge 104 and the second edge 106. The body 102 defines a lateral direction 110, which can be a direction extending from the first edge 104 to the second edge 106, and a longitudinal direction 112, which extends transversely to the lateral direction 110. Optionally, as shown in FIGS. 1 and 2, in some aspects, the fastening tape 100 has tabs 138 extending outwardly from the first edge 104 and second edge 106, respectively.

As shown in FIGS. 1-3, the fastening tape 100 includes sidewalls 114A,B. The sidewalls 114A,B extend in an upward direction from the top surface 108, and extend along the top surface 108 of the body 102 in the longitudinal direction 112. As illustrated in FIGS. 1-3, in one non-limiting example, the sidewall 114A is positioned proximate to the first edge 104 and the sidewall 114B is positioned proximate to the second edge 106.

In some aspects, each sidewall 114A,B includes sidewall components 116A-C. Although three sidewall components are illustrated, any number of sidewall components 116 can be present in each sidewall 114A,B, respectively, including one or more sidewall components. As illustrated in FIGS. 1 and 2, each sidewall component 116A-C extends in the upward direction from the top surface 108 and includes a plurality of plateaus and valleys. The plateaus and valleys may be present at regular or irregular intervals. The sidewall components 116 can have various-shaped profiles and are not limited to the illustrated arrangement. In some cases, the sidewall components 116 are substantially planar and do not have a plurality of plateaus and valleys. As illustrated in FIGS. 1 and 2, in some aspects, a plateau of one sidewall component is aligned with a valley of an adjacent sidewall component. The sidewalls 114A,B are arranged to act as a barrier to reduce the amount of foam intrusion into the space between the sidewalls 114A,B during a molding process.

As illustrated, the fastening tape 100 also has a plurality of fasteners 118 extending in the upward direction from the top surface 108 of the body 102. As shown in FIGS. 1-3, the fasteners 118 are positioned between the sidewalls 114A,B. Any suitable number of fasteners 118, including at least one fastener, may extend from the fastening tape 100. Fasteners 118 can have any suitable shape and configuration, including generally Y-shaped, J-shaped, etc. Each fastener 118 defines a fastener height f (illustrated in FIG. 3), which is a distance from the top surface 108 of the body 102 to a topmost end 132 of the fastener 118.

As illustrated in FIGS. 1 and 2, the fasteners 118 are arranged in rows that extend in the lateral direction 110 between the sidewalls 114A,B. In the illustrated example, each row of fasteners 118 includes five fasteners 118, however any suitable number of fasteners 118 can be present per row. Moreover, a width of the fastening tape 100, which is a distance from the first edge 104 to the second edge 106, can be adjusted as desired. For example, additional or fewer fasteners 118 may be present across the width of the fastening tape 100 depending on the width of the fastening tape 100.

Referring to FIGS. 1-3, the fastening tape 100 includes magnetic material 128A,B, such as, but not limited to, iron or a ferrous alloy. In some examples, the magnetic material 128A,B can be positioned between the sidewalls 114A,B. In other examples, the magnetic material 128A,B can be positioned between the sidewalls 114A,B and the edges 104 and 106 of the fastening tape 100, respectively. In one non-limiting example, the magnetic material 128 is iron monofilament, but any other suitable magnetic material can be present. As illustrated in FIGS. 1-3, the magnetic material 128 extends in the longitudinal direction 112 and is generally parallel to the sidewalls 114A,B. Each of the magnetic materials 128A,B can be continuous in the longitudinal direction 112, although it need not be. In some examples, the magnetic material 128A,B is positioned offset from, but proximate to, the top surface 108 of the body 102. In some examples, the magnetic material 128A,B extends through some of the fasteners 118 and transverse walls 130, as illustrated in FIG. 3.

The fastening tape 100 also includes transverse walls 130 that extend in the upward direction from the top surface 108 of the body 102 in the lateral direction 110. As shown in FIGS. 1-3, some of the transverse walls 130 connect laterally adjacent fasteners 118. Others of the transverse walls 130 connect some of the fasteners 118 and the sidewalls 114A,B, respectively. In one aspect, transverse walls 130 are connected on one or both sides of an individual fastener 118 to help increase the strength of the fastener 118. However, the transverse walls 130 need not contain, or be connected to, the fasteners 118. Each transverse wall 130 defines a height, which is a distance from the top surface 108 of the body 102 to a topmost end 134 of the transverse wall 130. In some examples, the height of the transverse walls 130 is approximately the same as the height of the fasteners 118, although it need not be. In some aspects, each transverse wall 130 defines a transverse wall width. In some cases, the transverse wall width generally corresponds to a distance between the adjacent structures that the transverse wall 130 connects, such as a distance between adjacent fasteners 118, a distance between a fastener 118 and a sidewall 114A,B, etc., minus a width of a slit 136 (or slits 136) (discussed below) if present.

As shown in FIGS. 1-3, at least one slit 136 is within a transverse wall 130 or adjacent to an end of at least one transverse wall 130 of the fastening tape 100. In the example illustrated in FIGS. 1-3, the slit 136 extends from the topmost end 134 of the transverse wall 130 towards the top surface 108 of the body 102. The slit 136 may represent a gap or space within a transverse wall 130 and/or a gap or space between a transverse wall 130 and an adjacent structure that the transverse wall 130 connects. For example, the slit 136 may be defined by a transverse wall 130 or by a transverse wall 130 and some other component of the fastening tape 100. As a non-limiting example, the slit 136 may be defined by a transverse wall 130, by a transverse wall 130 and a fastener 118, and/or by a transverse wall 130 and a sidewall 114A,B. In some cases, one or both sides of a fastener 118 do not abut a slit 136.

Referring to FIG. 3, as previously described, each fastener 118 has a height f, which is the distance from the topmost end 132 of the fastener 118 to the top surface 108 of the body 102. As illustrated, each slit 136 defines a height h, which is a distance from the topmost end 132 of the fastener 118 to the lowermost extent of the slit 136. The height h of the slit 136 is a value within the range of approximately $f \pm (0.15 \cdot f)$. This range of heights of the slit 136 can help provide a desired amount of flexibility in the fastening tape 100, as described in greater detail below.

In some aspects, h is greater than or equal to about f−0.15 f (or about 0.85 f) and less than or equal to about f+0.15 f (or about 1.15 f). In these aspects, the lowermost extent of the slit 136 can be at various positions above, below, or at the top surface 108. As one non-limiting example, a slit 136 can have a height h that is greater than or equal to approximately f and less than or equal to approximately 1.15 f. In some of these examples, the slits 136 can extend below the top surface 108 of the body 102 to form grooves in the body 102. As another non-limiting example, the lowermost extent of each slit 136 can be above the top surface 108 such that each slit 136 has a height h where h is greater than or equal to approximately 0.85 f and less than or equal to approximately f. In various other examples, h can be approximately the same value as f (illustrated in FIG. 3).

Still referring to FIG. 3, the body 102 defines a thickness t, which is a distance from the top surface 108 to the bottom surface 302 of the body 102. In some examples, the sum of t and f is the overall height of the fastening tape 100. A distance s is the distance from the bottom surface 302 of the body 102 to a lowermost extent of the slit 136. In various examples, the sum of h and s can be approximately the same as the sum of t and f.

In some cases, when the distance s is at a maximum value, smax, the height h is at a minimum. When the distance s is at a minimum value, smin, the height h is at a maximum. In this manner, the distance s is inversely related to the height h of the slits 136, and smin≤s≤smax. In some non-limiting examples, smax is less than or equal to approximately t+t and smin is greater than approximately t−t. In this manner, the distance s can be greater than or equal to the smin, which is greater than approximately t−t, and can be less than or equal to smax, which is less than or equal to approximately t+t. As one non-limiting example, the distance s can be a value of approximately t+(½)t (or approximately 50% greater than the thickness t of the body 102). In this example, if the thickness t of the base is 0.3 mm, the distance s is 0.3 mm+0.15 mm, or 0.45 mm. When s=t, the height h corresponds to a distance from the topmost end 134 of the transverse walls 130 to the top surface 108 of the body 102.

The location of the at least one slit 136 and/or the number of slits 136 may vary. Along these lines, any row of fasteners 118 may include any suitable number of slits. As illustrated in FIG. 3, the at least one slit 136 need not be present within all transverse walls 130. Moreover, more than one slit may be present in one or more of the transverse walls 130. In one non-limiting example, the number of slits 136 in a row is one less than the number of transverse walls 130 in the row, although this need not be the case. Moreover, a plurality of slits 136 can be present in multiple rows of fasteners 118. In those examples, the location of slits 136 in one row of fasteners 118 may be aligned or offset from the location of slits 136 in other rows of fasteners 118. In addition, the number of slits 136 in one row of fasteners 118 may be the same or may be different from the number of slits 136 in other rows of fasteners 118.

The slits 136 may have a uniform or non-uniform width. In some aspects, the slits 136 adjacent or within those transverse walls 130 connecting adjacent fasteners 118 may have a slit width that is less than the slit widths of the slits 136 adjacent or within those transverse walls 130 connecting the sidewalls 114A,B, although they need not. In various examples, slits 136 having a greater slit width may be positioned adjacent to the sidewalls 114A,B to help better conform the fastening tape 100 with a curved trench surface during a manufacturing process, as illustrated for example in FIG. 4B.

In one non-limiting example, each of the slits or a subset of slits 136 has a width between approximately 0.1 mm and 0.2 mm or between approximately 0.05 mm and approximately 0.2 mm. In another non-limiting example, at least some of the slits 136 narrow in width from the top surface 108 to the topmost end 134 of the transverse wall 130. The slits 136 can all have the same width, although they need not. In one non-limiting example, a width of some of the slits or subset of slits 136 is approximately 0.1 mm while a width of others of the slits 136 is approximately 0.2 mm. For example, a slit 136 between a transverse wall 130 connecting a fastener 118 and the sidewall 114A can have a width of approximately 0.2 mm or any other suitable width, while a slit 136 between a transverse wall 130 connecting adjacent fasteners 118 can have a width of approximately 0.1 mm or any other suitable width. The width of the slit or slits 136 may be selected to minimize foam intrusion during the molding process while allowing for a desired level of flexibility. In some cases, the width of the slit 136 is less than the transverse wall width.

The presence of slit or slits 136 may improve flexibility of the fastening tape 100 in the lateral direction 110 compared to a fastening tape that does not include a slit or slits 136. This in turn allows the fastening tape 100 to better conform to a curved surface on which the fastening tape 100 may be positioned, which in turn reduces the likelihood of foam intruding into the fasteners 118 of the fastening tape 100.

Referring to FIGS. 4A and 4B, the fastening tape 100 is shown positioned on a flat trench surface 584A and on a curved trench surface 584B. Although reference will now be made to the fastening tape 100, the following description is equally applicable to any other disclosed fastening tapes having slits 136. During a process of forming various articles and components, such as automotive seats, the fastening tape 100 is positioned on a trench surface within a mold. However, the shape of the trench surface may vary depending on manufacturer, component being formed, or various other factors. As non-limiting examples, a trench surface can be the flat trench surface 584A or the curved trench surface 584B. As illustrated in FIGS. 4A and 4B, the slits 136 can provide flexibility to the fastening tape 100 in the lateral direction 110 such that the fastening tape 100 better conforms to various-shaped trench surfaces. The slits 136 also can prevent or reduce foam intrusion into the fastening tape 100 regardless of the shape of the trench surface.

In some examples, as illustrated in FIGS. 4A and 4B, the top ends of the sidewalls 114A,B, or the portions of the sidewalls 114A,B distal from the body 102, can be angled, curved, or have various other shapes such that the sidewalls 114A,B can better conform with trench surfaces having various profiles. As one non-limiting example, the top ends of the sidewalls 114A,B can be angled to better conform with the curved trench surface 584B as illustrated in FIG. 4B.

In some examples, a height of the sidewalls 114A,B, or a distance from the top surface 108 to the top ends of the sidewalls 114A,B, may be greater than the height of the transverse walls 130. In these examples, the taller sidewalls 114A,B may better conform with the curved trench surface 584B.

Figure 5:
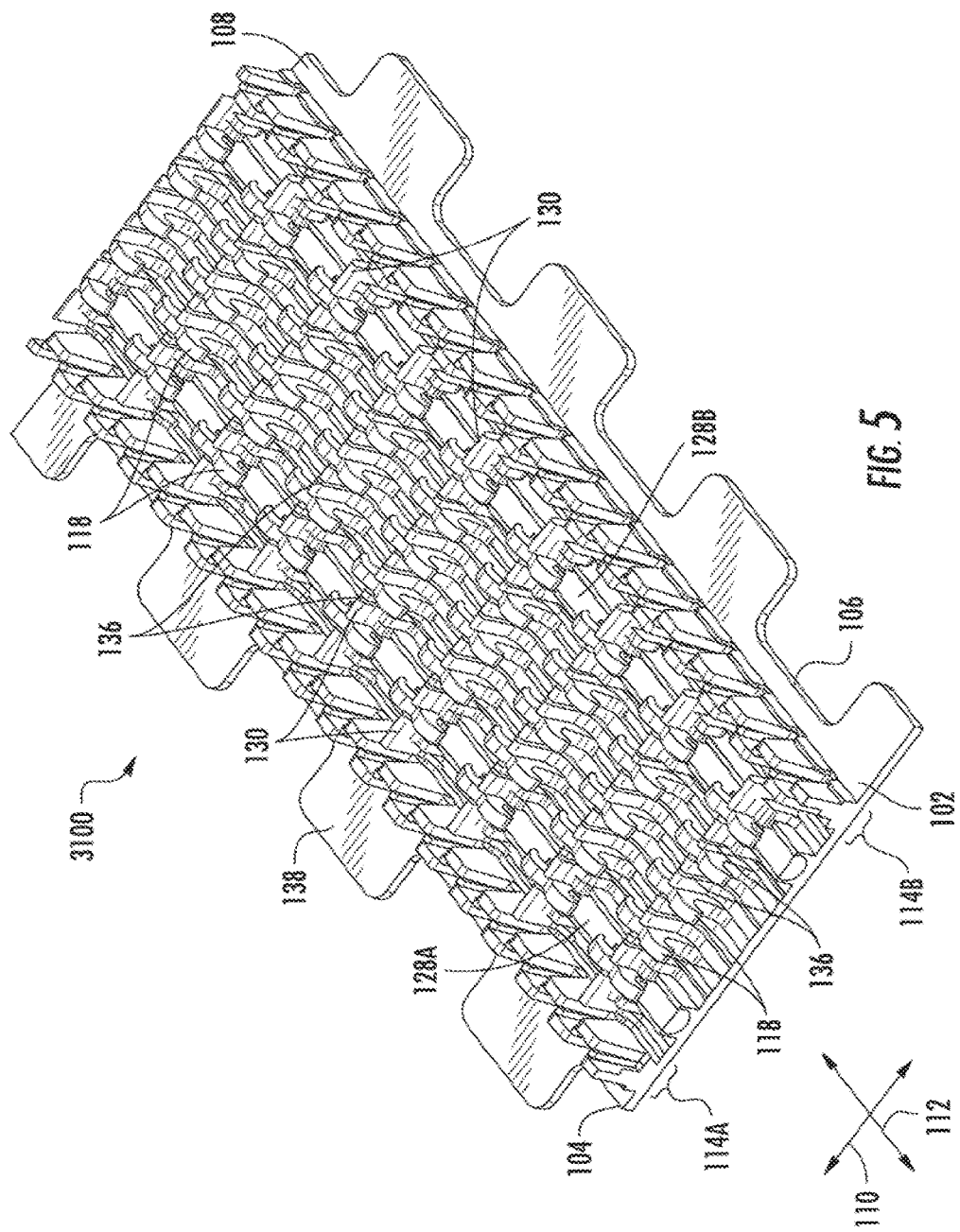
FIG. 5 is a perspective view of a segment of fastening tape according to an aspect of the current disclosure.

FIGS. 5, 6, and 7A illustrate another example of a fastening tape 3100. As illustrated, the fastening tape 3100 is similar to the fastening tape 100 except that the fastening tape 3100 defines ribs 3286 positioned within one or more of the slits 136 of the transverse walls 130. In some aspects, the ribs 3286 can help control the flexibility of the fastening tape 3100. For example, the ribs 3286 may prevent the fastening tape 3100 from being too flexible for a user's intended application while providing an appropriate amount of flexibility for that application. In other aspects, the ribs 3286 may help during the molding process of the fastening tape 3100. For example, the ribs 3286 may help form the fasteners 118 by supporting resin (or other material used to form the fastening tape 3100) to reach the tips of the fasteners 118.

The ribs 3286 extend in the upward direction from the top surface 108 of the body 102. Each rib 3286 defines a height, which is a distance from the top surface 108 to a topmost end 3288 of the rib 3286. In some aspects, the height of the ribs 3286 is less than the height of the transverse walls 130. As one non-limiting example, the transverse walls 130 can have a height of approximately 1.7 mm and the ribs 3286 can have a height of approximately 0.15 mm. In other examples, the ribs and transverse walls can have other suitable heights. The ribs 3286 can have any suitable profile and shape. If desired, fastening tape 3100 can include ribs 3286 of various profiles.

FIG. 7A illustrates a non-limiting example where the slits 136 have a height h where h is greater than or equal to approximately 0.85 f and less than or equal to approximately f. FIG. 7A also illustrates an example where, when s is approximately greater than t, the distance s corresponds to the distance from the bottom surface 302 of the body 102 to the topmost ends 3288 of the ribs 3286. In various examples, when s is approximately greater than t, the distance s corresponds to the distance from the bottom surface 302 of the body 102 to the topmost ends 3288 of the ribs 3286.

FIG. 7B illustrates another non-limiting example of a fastening tape 3300 that is substantially similar to the fastening tape 3100. However, compared to the fastening tape 3100, in the fastening tape 3300, the slits 136 extend below the top surface 108 of the body 102 to form grooves 3390 in the body 102. In this aspect, each slit 136 has a height h where h is greater than or equal to approximately f and less than or equal to approximately 1.15 f.

FIGS. 8 and 9 illustrate another example of a fastening tape 500. As illustrated in FIGS. 8 and 9, the fastening tape 500 is similar to the fastening tape 100 except that slits are not present within all of the transverse walls 130 such that some of the transverse walls 130 are continuous between adjacent components. For example and without limitation, FIGS. 8 and 9 illustrate an example where some of transverse walls 130 in a row of fasteners 118 are continuous between adjacent fasteners 118 (i.e., do not include slits).

Figure 10:
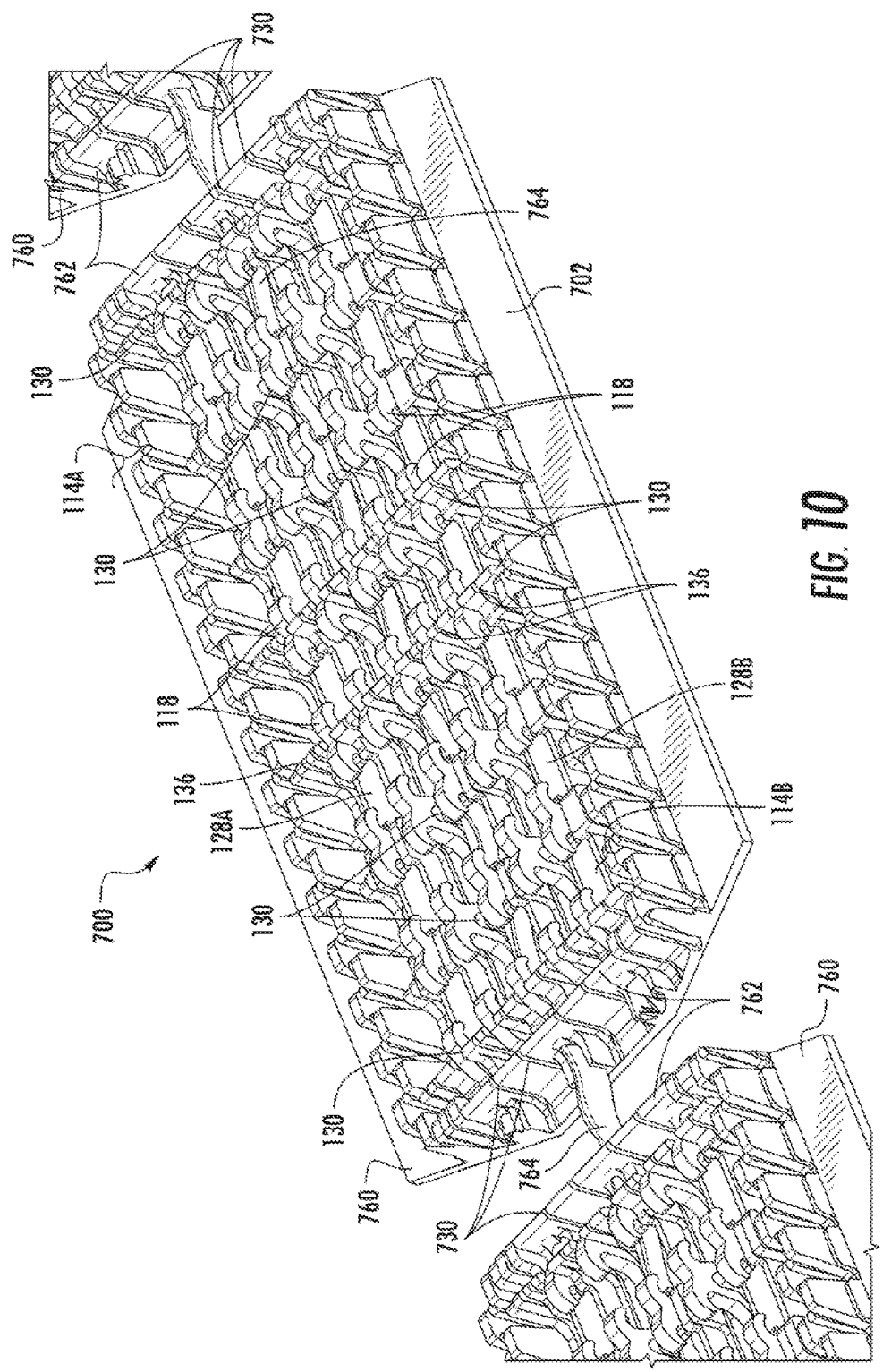
FIG. 10 is a top perspective view of joined segments of fastening tape according to an aspect of the current disclosure.
Figure 11:
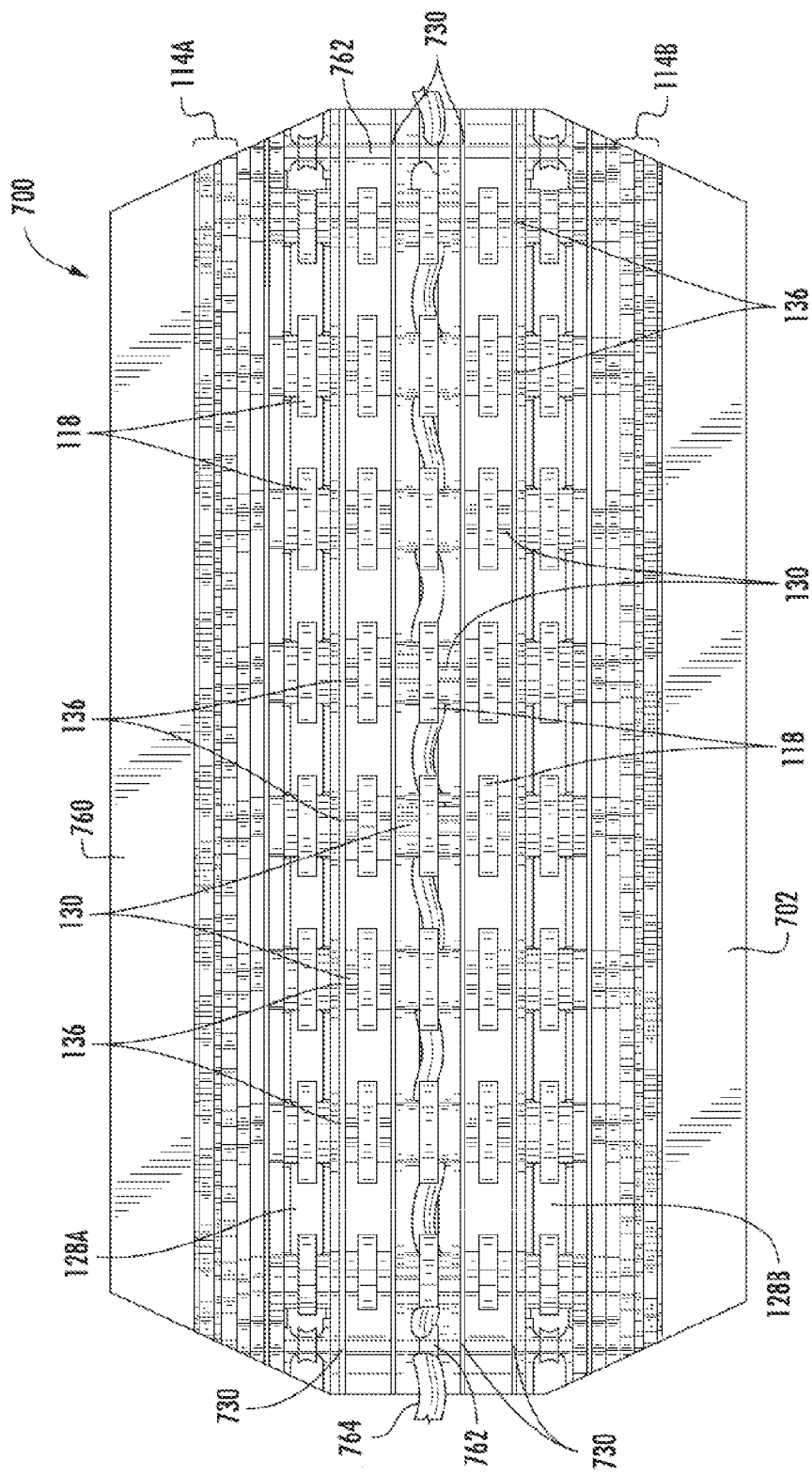
FIG. 11 is a top view of the joined segments of fastening tape of FIG. 10.
Figure 12:
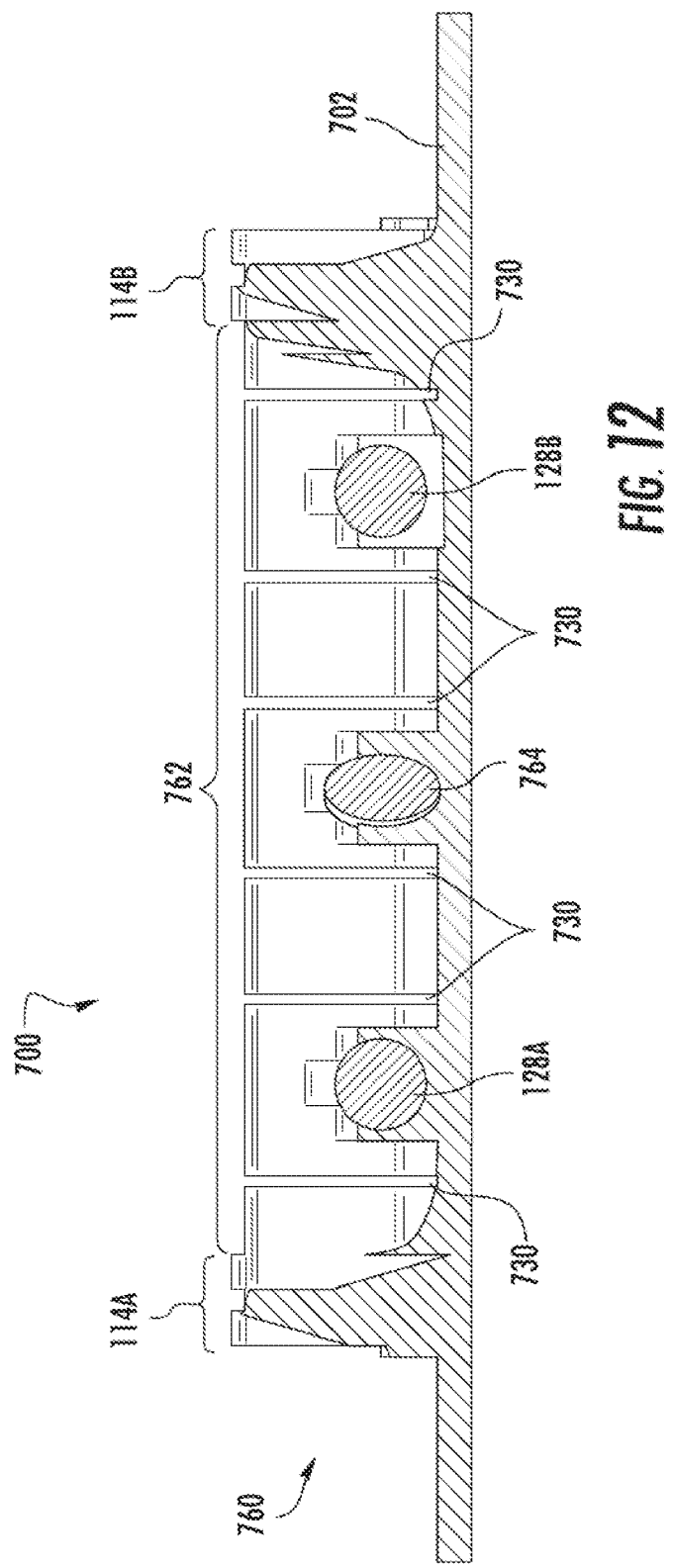
FIG. 12 is an end view of the joined segments of fastening tape of FIG. 10.

FIGS. 10-12 illustrate a fastening tape 700 having a plurality of joined fastening tape segments 760. Each fastening tape segment 760 includes a body 702 having a top surface 708. Similar to the fastening tape 100, each fastening tape segment 760 includes the sidewalls 114A,B, fasteners 118, and transverse walls 130, extending in the upward direction from the top surface 708, as well as the magnetic material 128A,B. As illustrated in FIGS. 10-12, in some aspects, each fastening tape segment 760 also has barrier walls 762 extending in the upward direction from the top surface 708 and between the sidewalls 114A,B. In another aspect, the barrier walls 762 of the fastening tape 700 include slits 730, which may be substantially similar to the slits 136. As illustrated, the fastening tape segments 760 are connected to one another by a flexible element 764. In some aspects, the flexible element 764 is positioned along the body 702 between the sidewalls 114A,B. In another aspect, the flexible element 764 is positioned between the magnetic material 128A,B. In a further aspect, the flexible element 764 extends through some of the fasteners 118, transverse walls 130, and/or barrier walls 762. In yet another aspect, the flexible element 764 does not extend along the body 702 and connects adjacent barrier walls 762.

As illustrated in FIGS. 10-12, in some examples, the fastening tape 700 includes some transverse walls 130 that have a height that is approximately the same as the height of the fasteners 118 and other transverse walls 130 that have a height that is less than the height of the fasteners 118. In one non-limiting example, as illustrated in FIG. 10, each fastening tape segment 760 includes four rows of fasteners 118 with transverse walls 130 having a height that is approximately the same as the height of the fasteners 118 and four rows of fasteners 118 with transverse walls 130 having a height that is less than the height of the fasteners 118. In other examples, various other combinations of transverse walls 130 can be present.

Figure 13:
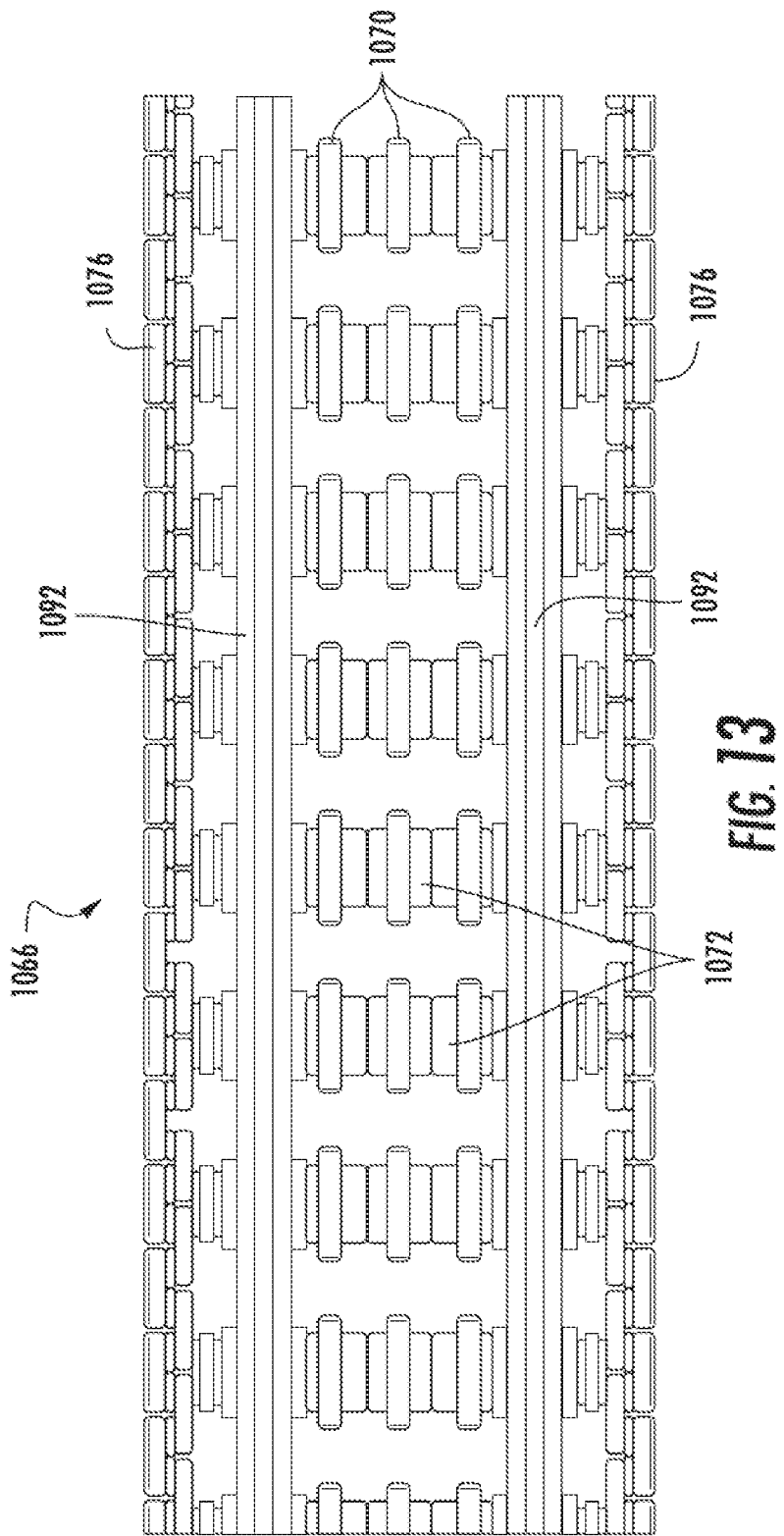
FIG. 13 is a front view of a model of an exemplary die wheel used to form the fastening tape of FIG. 1 according to an aspect of the current disclosure.

FIG. 13 illustrates an image model of an outer surface 1066 of a die wheel 1168 (illustrated in FIG. 14) used to form the fastening tape 100 as described herein. FIG. 13 is simply a representation of the outer surface 1066 for illustration purposes. The die wheel 1168 is cylindrical in shape and the outer surface 1066 defines a plurality of fastener-shaped cavities 1070 for forming the fasteners 118. In one aspect, the fastener-shaped cavities 1070 are hook-shaped cavities. As illustrated in FIG. 13, in some aspects, the outer surface 1066 of the die wheel 1168 also defines a plurality of cavities 1072 for forming the transverse walls 130 and a plurality of cavities 1076 for forming the sidewalls 114A,B. The outer surface 1066 of the die wheel 1168 also includes cavities 1092 for forming those locations where the magnetic material 128A,B is to be positioned on the fastening tape 100.

Figure 14:
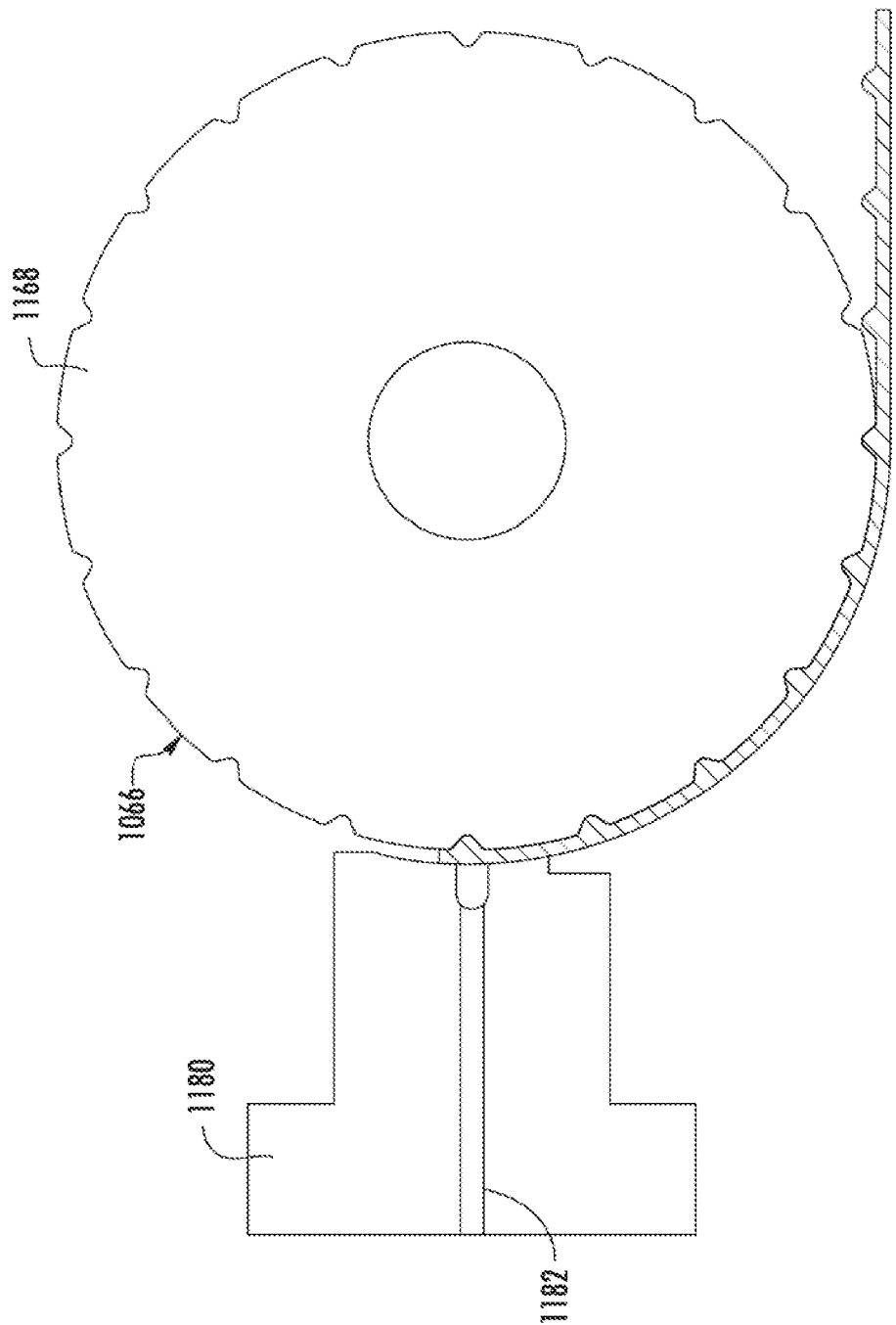
FIG. 14 is a side view of an exemplary extrusion process for forming the fastening tape of FIG. 1 according to an aspect of the current disclosure.

FIG. 14 is a schematic illustrating an exemplary extrusion process for forming the fastening tape 100 described above. As illustrated in FIG. 14, an extruder 1180 is positioned adjacent a die wheel 1168. The extruder 1180 includes a channel 1182 through which resin that forms the fastening tape 100 can flow. The channel 1182 is positioned with respect to the outer surface 1066 of the die wheel 1168 such that the resin can flow over the outer surface 1066 of the die wheel 1168. In one aspect, resin is introduced through the channel 1182 at the same time that magnetic material 128 (not illustrated) is also introduced with respect to die wheel 1168 form the fastening tape 100. In another aspect, the magnetic material 128 is introduced after the resin is introduced. The die wheel 1168 can rotate as the resin is introduced. The arrangement shown in FIGS. 13 and 14 is exemplary only and modifications can be made to form fastening tapes having other configurations.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A fastening tape comprising: a body comprising a first edge, a second edge distal from the first edge, a bottom surface extending between the first edge and the second edge, and a top surface extending between the first edge and the second edge, the body defining a lateral direction from the first edge to the second edge and a longitudinal direction transverse to the lateral direction; a plurality of fasteners extending in an upward direction from the top surface of the body and arranged in rows extending in the lateral direction of the body, wherein each fastener of the plurality of fasteners has a height f; a plurality of transverse walls extending in the upward direction from the top surface of the body, each transverse wall of the plurality of transverse walls extending in the lateral direction of the body and comprising a transverse wall width, wherein at least some of the plurality of transverse walls are arranged in the rows of the plurality of fasteners and connect fasteners of the rows of the plurality of fasteners; and at least one slit within or adjacent at least one of the plurality of transverse walls of the plurality of transverse walls, wherein the at least one slit extends from a topmost end of the transverse wall towards the top surface of the body, wherein the at least one slit has a slit width that is less the transverse wall width, and wherein the at least one slit has a height h that is less than or equal to approximately f+0.15 f and that is greater than or equal to approximately f−0.15 f.

EC 2. The fastening tape of any of the preceding or subsequent example combinations, further comprising: a first sidewall extending in the upward direction from the top surface of the body between the first edge and the second edge and a second sidewall extending in the upward direction from the top surface of the body between the first sidewall and the second edge; wherein the plurality of fasteners and the plurality of transverse walls are positioned on the top surface of the body between the first sidewall and the second sidewall.

EC 3. The fastening tape of any of the preceding or subsequent example combinations, wherein the at least one slit is defined by one of the transverse walls and the first sidewall.

EC 4. The fastening tape of any of the preceding or subsequent example combinations, wherein a height of the first sidewall is greater than a height of each of the plurality of transverse walls, and wherein a height of the second sidewall is greater than the height of each of the plurality of transverse walls.

EC 5. The fastening tape of any of the preceding or subsequent example combinations, wherein the at least one slit is defined by one of the plurality of transverse walls and one of the plurality of fasteners.

EC 6. The fastening tape of any of the preceding or subsequent example combinations, wherein the at least one slit is defined by at least one of the plurality of transverse walls connecting fasteners of the rows of the plurality of fasteners.

EC 7. The fastening tape of any of the preceding or subsequent example combinations, wherein each of the plurality of fasteners comprises a hook.

EC 8. The fastening tape of any of the preceding or subsequent example combinations, wherein a height of each of the plurality of transverse walls is generally the same as a height of each of the plurality of fasteners.

EC 9. The fastening tape of any of the preceding or subsequent example combinations, further comprising a rib positioned within the at least one slit, wherein the rib extends in the upward direction from the top surface of the body, EC 10. The fastening tape of any of the preceding or subsequent example combinations, wherein the height h of the at least one slit extends from topmost ends of the plurality of fasteners to a topmost end of the rib, and wherein h is greater than or equal to approximately f and is less than or equal to approximately f+0.15 f.

EC 11. a fastening tape comprising: a body comprising a first edge, a second edge distal from the first edge, a bottom surface extending between the first edge and the second edge, and a top surface extending between the first edge and the second edge, the body defining a lateral direction from the first edge to the second edge and a longitudinal direction transverse to the lateral direction; a first sidewall extending in an upward direction from the top surface between the first edge and the second edge; a second sidewall extending in the upward direction from the top surface between the first sidewall and the second edge; a plurality of fasteners extending in an upward direction from the top surface of the body and arranged in rows extending in the lateral direction of the body between the first sidewall and the second sidewall, wherein each fastener of the plurality of fasteners has a height f; a plurality of transverse walls extending in the upward direction from the top surface of the body, each transverse wall of the plurality of transverse walls extending in the lateral direction of the body between the first sidewall and the second sidewall and comprising a transverse wall width, wherein at least some of the plurality of transverse walls are arranged in the rows of the plurality of fasteners and extend between fasteners of the rows of the plurality of fasteners, wherein a height of each of the plurality of transverse walls is generally the same as a height of each of the plurality of fasteners; and at least one slit within or adjacent at least one of the plurality of transverse walls of the plurality of transverse walls, wherein the at least one slit extends from a topmost end of the transverse wall towards the top surface of the body, wherein the at least one slit has a slit width that is less the transverse wall width, and wherein the at least one slit has a height h that is less than or equal to approximately f+0.15 f and that is greater than or equal to approximately f−0.15 f.

EC 12. The fastening tape of any of the preceding or subsequent example combinations, wherein the at least one slit is defined by at least one of the plurality of transverse walls and the first sidewall.

EC 13. The fastening tape of any of the preceding or subsequent example combinations, wherein the at least one slit is defined by one of the plurality of transverse walls and one of the plurality of fasteners.

EC 14. The fastening tape of any of the preceding or subsequent example combinations, wherein the at least one slit is defined by at least one of the plurality of transverse walls arranged in the rows of the plurality of fasteners and extending between fasteners of the rows of the plurality of fasteners.

EC 15. The fastening tape of any of the preceding or subsequent example combinations, wherein the at least one slit is in a first of the rows of the plurality of fasteners, and wherein a second slit is in a second of the rows of the plurality of fasteners.

EC 16. The fastening tape of any of the preceding or subsequent example combinations, wherein the at least one slit extends from the topmost end of the transverse wall to a position below the top surface of the body.

EC 17. The fastening tape of any of the preceding or subsequent example combinations, wherein the at least one slit extends from the topmost end of the transverse wall to a position above the top surface of the body.

EC 18. The fastening tape of any of the preceding or subsequent example combinations, wherein the at least one slit extends from the topmost end of the transverse wall to the top surface of the body.

EC 19. A fastening tape comprising: a body comprising a first edge, a second edge distal from the first edge, a bottom surface extending between the first edge and the second edge, and a top surface extending between the first edge and the second edge, the body defining a lateral direction from the first edge to the second edge and a longitudinal direction transverse to the lateral direction; a plurality of fasteners extending in an upward direction from the top surface of the body and arranged in rows extending in the lateral direction of the body between the first edge and the second edge, wherein each fastener of the plurality of fasteners has a height f; a plurality of transverse walls extending in the upward direction from the top surface of the body, each transverse wall of the plurality of transverse walls extending in the lateral direction of the body and comprising a transverse wall width, wherein at least some of the plurality of transverse walls are arranged in the rows of the plurality of fasteners and extend between fasteners of the rows of the plurality of fasteners; a first slit within or adjacent at least one of the plurality of transverse walls of the plurality of transverse walls in a first of the rows of the plurality of fasteners, wherein the first slit extends from a topmost end of the transverse wall towards the top surface of the body and has a first slit width that is less the transverse wall width, and wherein the first slit has a height h that is less than or equal to approximately f+0.15 f and that is greater than or equal to approximately f−0.15 f; and a second slit within or adjacent at least one of the plurality of transverse walls of the plurality of transverse walls in a second of the rows of the plurality of fasteners, wherein the second slit extends from the topmost end of the transverse wall towards the top surface of the body and has a second slit width that is less the transverse wall width.

EC 20. The fastening tape of any of the preceding or subsequent example combinations, wherein the first slit width of the first slit is greater than the second slit width of the second slit.

EC 21. The fastening tape of any of the preceding or subsequent example combinations, wherein at least one of the first slit and the second slit extends from the topmost end of the transverse wall to a position below the top surface of the body.

EC 22. The fastening tape of any of the preceding or subsequent example combinations, wherein at least one of the first slit and the second slit extends from the topmost end of the transverse wall to a position above the top surface of the body.

EC 23. The fastening tape of any of the preceding or subsequent example combinations, wherein at least one of the first slit and the second slit extends from the topmost end of the transverse wall to the top surface of the body.

EC 24. The fastening tape of any of the preceding or subsequent example combinations, further comprising: a first sidewall extending in the upward direction from the top surface of the body between the first edge and the second edge; and a second sidewall extending in the upward direction from the top surface of the body between the first sidewall and the second edge; wherein the plurality of fasteners and the plurality of transverse walls are positioned on the top surface of the body between the first sidewall and the second sidewall.

EC 25. The fastening tape of any of the preceding or subsequent example combinations, further comprising at least one magnetic portion extending in the longitudinal direction.

EC 26. The fastening tape of any of the preceding or subsequent example combinations, wherein the first slit is defined by one of the plurality of transverse walls and the first sidewall.

EC 27. The fastening tape of any of the preceding or subsequent example combinations, wherein the first slit is defined by one of the plurality of transverse walls and one of the plurality of fasteners.

EC 28. The fastening tape of any of the preceding or subsequent example combinations, wherein the first slit is defined by at least one of the plurality of transverse walls arranged in the rows of the plurality of fasteners and extending between fasteners of the rows of the plurality of fasteners.

EC 29. The fastening tape of any of the preceding or subsequent example combinations, further comprising a rib positioned within the first slit, wherein the rib extends in the upward direction from the top surface of the body, EC 30. The fastening tape of any of the preceding or subsequent example combinations, wherein the height h of the first slit extends from topmost ends of the plurality of fasteners to a topmost end of the rib, and wherein h is greater than or equal to approximately f and less than or equal to approximately f+0.15 f.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

That which is claimed is:

1. A fastening tape comprising:
a body comprising a first edge, a second edge distal from the first edge, a bottom surface extending between the first edge and the second edge, and a top surface extending between the first edge and the second edge, the body defining a lateral direction from the first edge to the second edge and a longitudinal direction transverse to the lateral direction;
a plurality of fasteners extending in an upward direction from the top surface of the body and arranged in rows extending in the lateral direction of the body, wherein each fastener of the plurality of fasteners has a height f;
a plurality of transverse walls extending in the upward direction from the top surface of the body, each of the transverse walls extending in the lateral direction of the body, wherein at least one of the transverse walls comprises a plurality of transverse wall sections having a transverse wall width, wherein at least one of the transverse wall sections connects adjacent fasteners arranged in one of the rows to each other; and
a slit within the at least one transverse wall section connecting adjacent fasteners, wherein the slit extends from a topmost end of the transverse wall towards the top surface of the body, wherein the slit has a slit width that is less the transverse wall width and wherein the slit has a height h that is less than or equal to approximately f+0.15 f and that is greater than or equal to approximately f−0.15 f.

2. The fastening tape of claim 1, further comprising:
a first sidewall extending in the upward direction from the top surface of the body between the first edge and the second edge; and
a second sidewall extending in the upward direction from the top surface of the body between the first sidewall and the second edge,
wherein the plurality of fasteners and the plurality of transverse walls are positioned on the top surface of the body between the first sidewall and the second sidewall.

3. The fastening tape of claim 2, further comprising a slit that is defined by one of the transverse walls and the first sidewall.

4. The fastening tape of claim 2, wherein a height of the first sidewall is greater than a height of each of the transverse walls, and wherein a height of the second sidewall is greater than the height of each of the transverse walls.

5. The fastening tape of claim 1, further comprising a slit that is defined by one of the transverse wall sections and one of the fasteners.

6. The fastening tape of claim 1, wherein each of the fasteners comprises a hook.

7. The fastening tape of claim 1, wherein a height of each of the transverse walls is generally the same as a height of each of the fasteners.

8. The fastening tape of claim 1, further comprising a rib positioned within the slit, wherein the rib extends in the upward direction from the top surface of the body.

9. The fastening tape of claim 8, wherein the height h of the slit extends from topmost ends of the plurality of fasteners to a topmost end of the rib, and wherein h is less than or equal to approximately f and is greater than or equal to approximately f−0.15 f.

10. A fastening tape comprising:
a body comprising a first edge, a second edge distal from the first edge, a bottom surface extending between the first edge and the second edge, and a top surface extending between the first edge and the second edge, the body defining a lateral direction from the first edge to the second edge and a longitudinal direction transverse to the lateral direction;
a first sidewall extending in an upward direction from the top surface between the first edge and the second edge;

a second sidewall extending in the upward direction from the top surface between the first sidewall and the second edge;
a plurality of fasteners extending in the upward direction from the top surface) of the body and arranged in rows extending in the lateral direction of the body between the first sidewall and the second sidewall, wherein each fastener of the plurality of fasteners has a height f;
a plurality of transverse walls extending in the upward direction from the top surface of the body, each of the transverse walls extending in the lateral direction of the body between the first sidewall and the second sidewall, wherein at least one of the transverse walls comprises a plurality of transverse wall sections having a transverse wall width, wherein at least one of the plurality of transverse wall sections connects adjacent fasteners arranged in one of the rows to each other, wherein a height of each of the transverse walls is generally the same as a height of each of the fasteners; and
a slit within the at least one of the transverse wall section connecting adjacent fasteners, wherein the slit extends from a topmost end of the transverse wall towards the top surface of the body, wherein the slit has a slit width that is less the transverse wall width, and wherein the slit has a height h that is less than or equal to approximately f+0.15 f and that is greater than or equal to approximately f−0.15 f.

11. The fastening tape of claim 10, further comprising a slit that is defined by one of the transverse walls and the first sidewall.

12. The fastening tape of claim 10, further comprising a slit that is defined by one of the transverse wall sections and one of the fasteners.

13. The fastening tape of claim 10, wherein the slit is in a first of the rows of the fasteners, and wherein a second slit is in a second of the rows of the fasteners.

14. The fastening tape of claim 13, wherein the slit extends from the topmost end of the transverse wall to a position below the top surface of the body.

15. The fastening tape of claim 13, wherein the slit extends from the topmost end of the transverse wall to a position above the top surface of the body.

16. The fastening tape of claim 13, wherein the slit extends from the topmost end of the transverse wall to the top surface of the body.

17. A fastening tape comprising:
a body comprising a first edge, a second edge distal from the first edge, and a top surface extending between the first edge and the second edge, the body defining a lateral direction from the first edge to the second edge and a longitudinal direction transverse to the lateral direction;
a plurality of fasteners extending in an upward direction from the top surface of the body and arranged in rows extending in the lateral direction of the body between the first edge and the second edge, wherein each fastener of the plurality of fasteners has a height f;
a plurality of transverse walls extending in the upward direction from the top surface of the body, each of the transverse walls extending in the lateral direction of the body, wherein at least one of the transverse walls comprises a plurality of transverse wall sections having a transverse wall width, and wherein at least one of the transverse wall sections connects adjacent fasteners arranged in one of the rows to each other;
a first slit within the at least one of transverse wall section connecting adjacent fasteners in a first of the rows of the fasteners, wherein the first slit extends from a topmost end of the transverse wall towards the top surface of the body and has a first slit width that is less the transverse wall width, and wherein the first slit has a height h that is less than or equal to approximately f+0.15 f and that is greater than or equal to approximately f−0.15 f; and
a second slit within a transverse wall section of a second transverse wall in a second of the rows of the fasteners, wherein the second slit extends from the topmost end of the transverse wall towards the top surface of the body and has a second slit width that is less the transverse wall width.

18. The fastening tape of claim 17, wherein the first slit width of the first slit is greater than the second slit width of the second slit.

19. The fastening tape of claim 17, wherein at least one of the first slit and the second slit extends from the topmost end of the transverse wall to a position below the top surface of the body.

20. The fastening tape of claim 17, wherein at least one of the first slit and the second slit extends from the topmost end of the transverse wall to a position above the top surface of the body.

21. The fastening tape of claim 17, wherein at least one of the first slit and the second slit extends from the topmost end of the transverse wall to the top surface of the body.

22. The fastening tape of claim 17, further comprising:
a first sidewall extending in the upward direction from the top surface of the body between the first edge and the second edge; and
a second sidewall extending in the upward direction from the top surface of the body between the first sidewall and the second edge,
wherein the fasteners and the transverse walls are positioned on the top surface of the body between the first sidewall and the second sidewall.

23. The fastening tape of claim 17, further comprising at least one magnetic portion extending in the longitudinal direction.

24. The fastening tape of claim 22, further comprising a slit that is defined by one of the transverse walls and the first sidewall.

25. The fastening tape of claim 17, further comprising a slit that is defined by one of the transverse walls and one of the fasteners.

26. The fastening tape of claim 17, further comprising a rib positioned within the first slit, wherein the rib extends in the upward direction from the top surface of the body.

27. The fastening tape of claim 26, wherein the height h of the first slit extends from topmost ends of the plurality of fasteners to a topmost end of the rib, and wherein h is less than or equal to approximately f and greater than or equal to approximately f−0.15 f.

* * * * *

UNITED STATES PATENT AND TRADEMARK OFFICE
CERTIFICATE OF CORRECTION

PATENT NO. : 10,189,387 B2
APPLICATION NO. : 15/154676
DATED : January 29, 2019
INVENTOR(S) : Zhiyu Ren et al.

It is certified that error appears in the above-identified patent and that said Letters Patent is hereby corrected as shown below:

In the Specification

In Column 2, Lines 3-4, delete "less the" and insert -- less than --, therefor.

In Column 2, Line 38, delete "less the" and insert -- less than --, therefor.

In Column 2, Line 41, delete "less the" and insert -- less than --, therefor.

In Column 10, Line 38, delete "less the" and insert -- less than --, therefor.

In Column 11, Line 15, delete "body," and insert -- body. --, therefor.

In Column 11, Line 23, delete "11. a" and insert -- 11. A --, therefor.

In Column 11, Line 53, delete "less the" and insert -- less than --, therefor.

In Column 12, Line 44, delete "less the" and insert -- less than --, therefor.

In Column 12, Lines 52-53, delete "less the" and insert -- less than --, therefor.

In Column 13, Line 36, delete "body," and insert -- body. --, therefor.

In the Claims

In Column 14, Line 19, in Claim 1, delete "less the" and insert -- less than --, therefor.

In Column 15, Line 5, in Claim 10, delete "surface)" and insert -- surface --, therefor.

In Column 15, Line 25, in Claim 10, delete "less the" and insert -- less than --, therefor.

Signed and Sealed this
Twenty-sixth Day of March, 2019

Andrei Iancu
*Director of the United States Patent and Trademark Office*

CERTIFICATE OF CORRECTION (continued)
U.S. Pat. No. 10,189,387 B2

In Column 16, Lines 9-10, in Claim 17, delete "less the" and insert -- less than --, therefor.

In Column 16, Line 19, in Claim 17, delete "less the" and insert -- less than --, therefor.